UNITED STATES PATENT OFFICE.

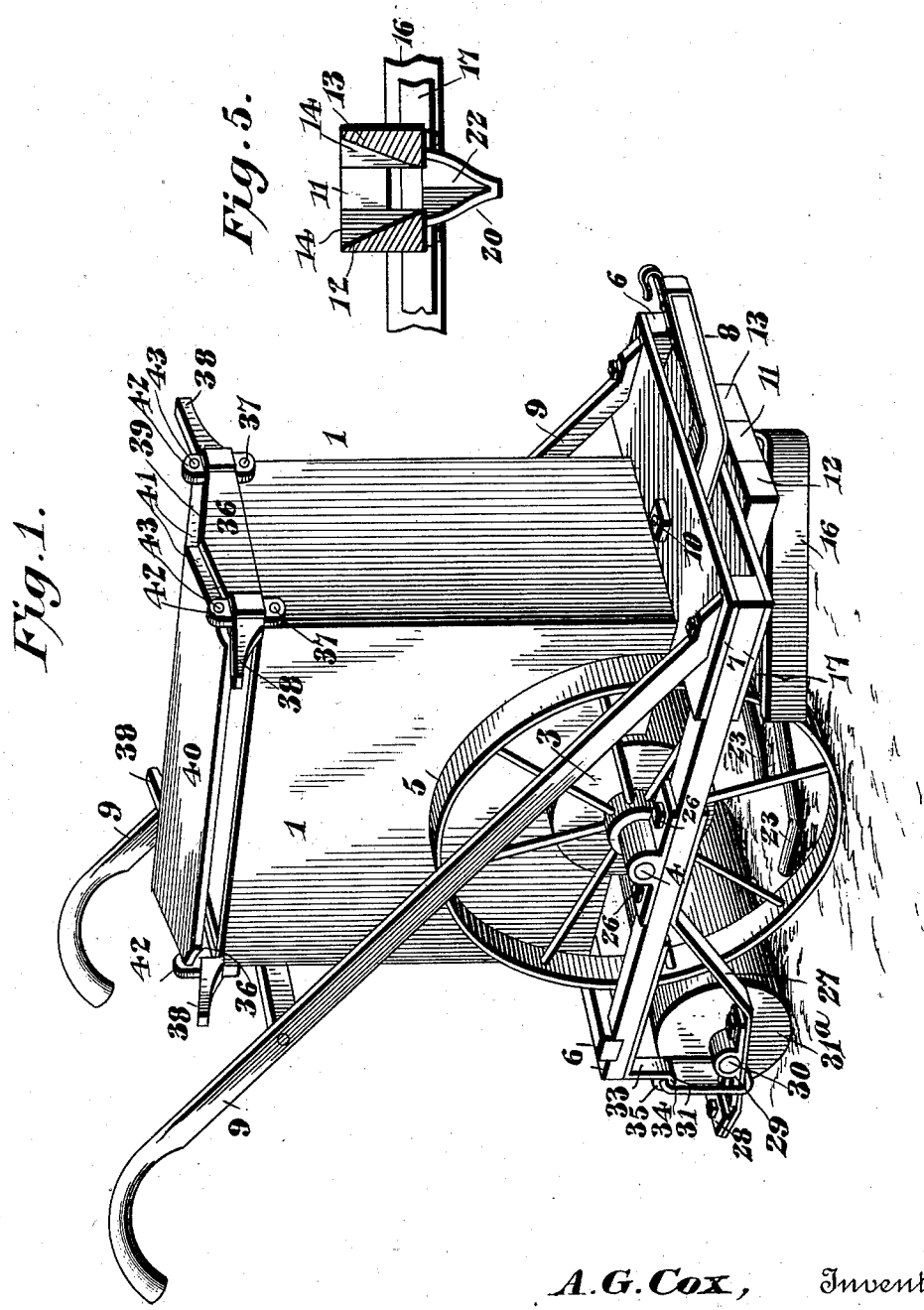

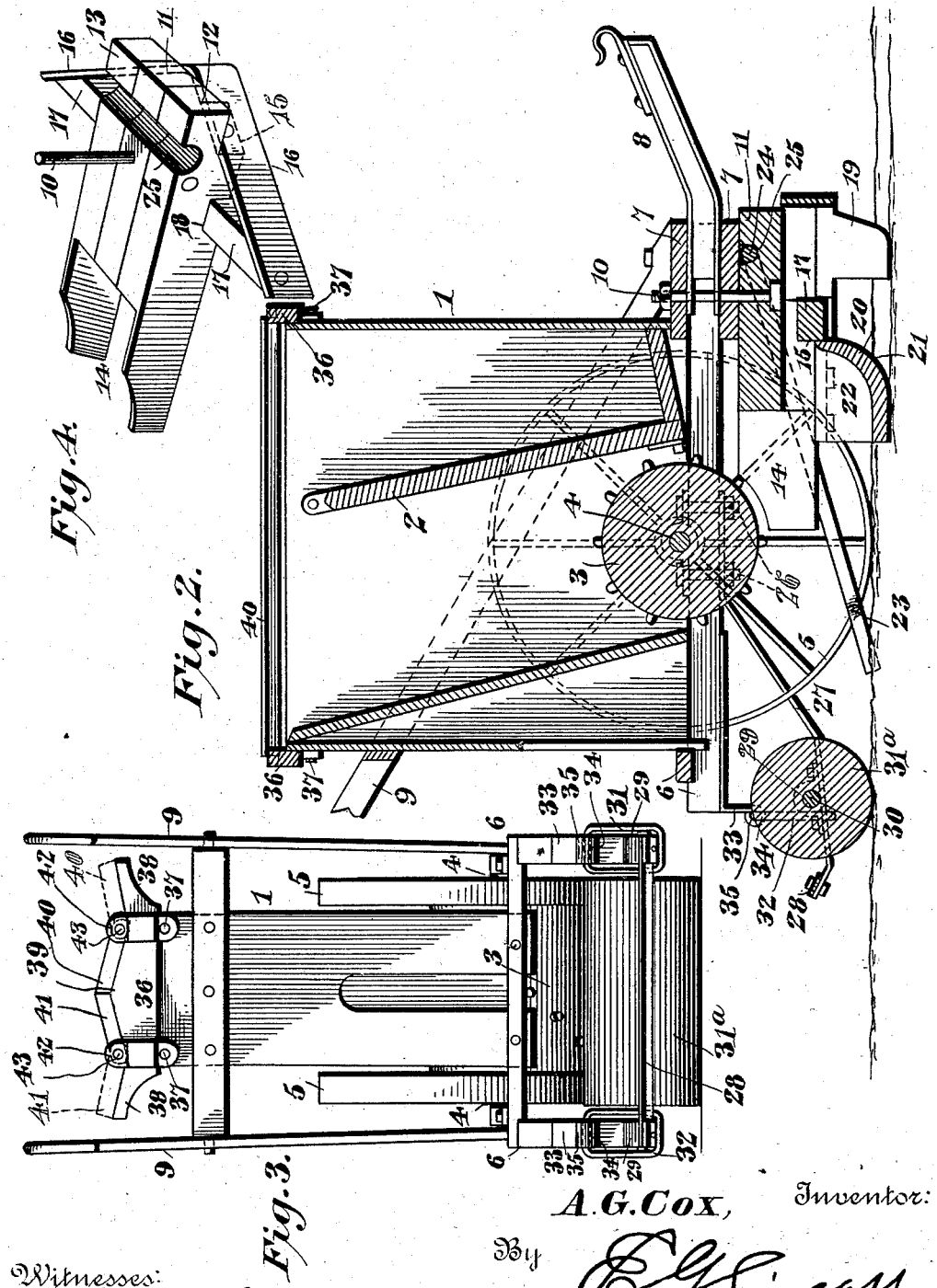

AMOS G. COX, OF WINTERVILLE, NORTH CAROLINA.

COTTON-SEED PLANTER.

SPECIFICATION forming part of Letters Patent No. 698,459, dated April 29, 1902.

Application filed July 16, 1901. Serial No. 68,522. (No model.)

*To all whom it may concern:*

Be it known that I, AMOS G. COX, a citizen of the United States, residing at Winterville, in the county of Pitt and State of North Carolina, have invented a new and useful Cotton-Seed Planter, of which the following is a specification.

This invention relates to cotton-seed planters, and has for its object to provide a novel form of mechanism for preparing the land for receiving the seed and for covering up the seed.

A further object is to provide means by which the ground in advance of the machine will be leveled and cleared of trash and obstructions, whereby in the operation of the machine when the ground is opened and the seed deposited the proper planting of the seed will be effected.

A further object is to provide a novel form of roller-support, with means whereby to prevent the support from becoming injured when the machine is heavily depressed.

With these and other objects in view, as will appear as the nature of the invention is better understood, the same consists in the novel construction and combination of parts of a cotton-seed planter, as will be hereinafter fully described and claimed.

In the accompanying drawings, forming a part of the specification, and in which like numerals of reference indicate corresponding parts, I have illustrated a form of embodiment of the invention capable of carrying my ideas into effect, it being understood that the manner of construction and arrangement of parts herein shown may be varied or changed without departing from the spirit of the invention, and in these drawings—

Figure 1 is a view in perspective of the machine, the view being taken from the front. Fig. 2 is a vertical longitudinal sectional view. Fig. 3 is a view in rear elevation. Fig. 4 is a detached detail view in perspective, showing the shoe with the fender or sweep associated therewith and also the furrow-opener and depressing-gage. Fig. 5 is a detached detail view, in sectional elevation, of the shoe.

Referring to the drawings, 1 designates the seedbox, having arranged therein an adjustable partition 2; 3, the feed-roller, provided with the usual pins for effecting the feed of the seed from the seedbox to the furrow; 4, the supporting-axle upon which the cylinder is mounted; 5, the supporting-wheels, and 6 the supporting-frame. As these parts may be of any usual or preferred construction, detail description is deemed unnecessary.

At the front of the frame there are secured two cross-pieces 7, between which is pivoted a draw-beam 8, the connection between the beam and the cross-pieces being such that when the machine is being drawn over the ground the horse may deviate somewhat from the furrow without throwing the machine out of alinement therewith, and connecting with the cross-pieces 7 and extending to the rear of the seedbox are the usual handles 9. The bolt 10, that holds the draw-beam associated with the frame, also serves to secure thereto at its under side a beam 11, to which are secured the two members 12 and 13 of the shoe, the rear end of the shoe being cut away to present a hopper-shaped throat 14, into which the seed from the seedbox is dropped as they are drawn therefrom by the pins on the feed-cylinder and are guided into the middle of the furrow. The outer ends of the under surface of the shoe members are diagonally recessed, as at 15, to present bearings for a fender or sweep 16, the same being constructed, preferably, of a piece of metal approximately V-shaped, with the point at the front of the machine, the rear ends of the fender being secured to a cross-beam 17, seated in transverse recesses 18 in the under side of the shoe members, and by this arrangement the fender will be rigidly held in position and will be able to withstand without injury or loosening the jars and shocks incident to contact with obstacles when being drawn over the ground.

Secured between the shoe members back of the fender or sweep 16 and between its apex and the front wall of the cross-beam 17 is a furrow-opener 19, the same being of narrow wedge shape in plan, with its front face slightly rounded, this opener operating initially to break up the ground even if the same be very hard. Arranged back of the cross-beam 17 and between the shoe members is a depressing-gage 20, this operating to smooth and render even the walls of the furrow formed by the furrow-opener 19. To effect this, the sides of the depressing-gage are concaved inward somewhat on the lines of an ordinary plowshare, presenting a sharp nose 21, rounded in elevation, the nose, in conjunction with the sides of the gage, operating to deflect the soil loosened up by the furrow-opener 19 and evenly distribute it on each side of the furrow. The upper portion of the rear end of the depressing-gage is cut away to present a V-shaped recess 22, into which the seed from the seedbox will drop, being guided thereto by the inclined walls of the shoe, and thence into the furrow.

As a means for covering the furrow in over the seed that has been dropped I employ a coverer 23, the same being constructed of a rod of metal bent to form a cross-bar 24, which is adapted to rest in a recess 25, formed in the upper faces of the front portion of the beam 11 and the shoe members 12 and 13, the members of the coverer being carried back parallel with and along the side of the shoe and past the rear end of the same, and has its terminals incurved thereby to bring them close together, and this coverer, as will be apparent, will operate to draw the earth from each side over the seeds and cover them with a small ridge of earth. The open space between the terminals of the cover will permit clods or trash to pass without any dragging action which would tend to disturb the deposited seed.

Secured to the under side of the supporting-frame and held in place thereagainst, in this instance by the bolts 26, that clamp the journal-boxes of the supporting-wheels in position, are two spring-arms 27, the rear ends of which are slightly upturned and are connected by a bar 28, constituting a scraper. On the upper sides of the arms 27 are secured two journal-boxes 29, the same to be engaged by the shaft 30 of a roller 31ª, the function of this roller, as will be well understood, being to press down the soil over the seed. As will be apparent, the weight of this roller will be considerable, and in order to remove any danger of damage to the spring-arms from the weight of the roller two links 31 and 32 are employed, through which the arms are passed, the links being supported from the supporting-frame by straps 33, securely bolted to the supporting-frame and having their outer ends bent downward to present stops 34, and then into eyes 35, in which the links are housed. In the operation of the device the weight of the roller will cause the spring-arms to be flexed downward; but any danger of damage to the arms will be prevented by the links heretofore described. If considerable downward pressure be applied to the handles, this will tend to cause an upward flexure of the spring-arms; but such flexure as would endanger the said arms is obviated by contact between the stops 34 and the arms, as pointed out.

As a means for covering the mouth of the feed-box and also of presenting supports upon which the bag containing the seed may rest when the seedbox is being filled, I employ at each end of the seedbox two castings or plates 36, secured to the respective ends of the box by bolts or screws 37, the castings being provided at each end with an outward and upward extending arm 38 and intermediate of its length with a hip-shaped support 39, upon which the members 40 and 41 of a two-part lid or cover will rest when in position to close the top of the seedbox, as shown in full lines in Fig. 3, the arms 38 being engaged by the lid-sections when the same are turned outward, as indicated by dotted lines in Fig. 3. As a means for connecting the lid-sections with the castings, the latter are provided each with two perforated ears 42, through which extend pintles or butts 43, carried by the lid-sections. By reason of the hip-support 39 of the castings the lid-sections will never be permitted to fold flat down, so that any danger of jamming or locking in use will be entirely obviated.

It will be seen from the foregoing description that while the device of the present invention is of exceedingly simple construction, the parts constituting the invention are so constructed and coöperate with each other in such a manner as to produce the most satisfactory results in operation. Furthermore, by reason of the simplicity of the construction of the parts should one or more of them become damaged or deranged in use ready replaceal of the parts may be effected.

From the foregoing it is thought that the construction, operation, and many advantages of the herein-described invention will be apparent to those skilled in the art without further description, and it will be understood that various changes in the size, shape, proportion, and minor details of construction may be resorted to without departing from the spirit or sacrificing any of the advantages of the invention.

What I claim is—

1. In a planter, the combination with a wheeled frame having a seedbox, of a shoe secured to the frame and located in front of the seedbox, the rear portion of the shoe having a throat which is open at its top and bottom and is projected beneath the discharge-opening of the seedbox to receive the seed therefrom, an opener carried by the front of the shoe and a hollow depressing-gage carried by the rear portion of the shoe beneath the throat thereof and in alinement with the opener and having an open top and an open rear end to receive and discharge the seed to the furrow.

2. In a planter, the combination with a wheeled frame having a seedbox, of a shoe secured to the frame and located in front of the seedbox, the rear portion of the shoe having a throat which is open at its top and bottom and is projected beneath the discharge-opening of the seedbox to receive the seed therefrom, a hollow depressing-gage carried by the rear portion of the shoe beneath the throat thereof and having an open top and an open rear end to receive and discharge the seed to the furrow, a cross-bar carried by and projected at opposite sides of the shoe, a substantially V-shaped fender embracing the front end of the shoe and having its ends connected to the respective ends of the cross-bar, and an opener alined in front of the depressing-gage and held between the cross-bar and the apex of the fender.

3. In a seed-planter, the combination with a seedbox, and a furrow-opener located in front thereof, of a depressing-gage located in rear of and alined with the opener, and also alined below the discharge-opening of the seedbox, and having its top open to receive the seed from the box and also having its rear end open to deliver the seed to the furrow made by the furrow-opener.

4. In a seed-planter, the combination with a seedbox, and a furrow-opener located in front thereof, of a shoe located between the box and the furrow-opener and having a rear throat portion located below the discharge-opening of the box and having its opposite inner walls converged inwardly and downwardly, and a depressing-gage located beneath and in close proximity to the forward portion of the throat and spanning the bottom opening thereof so as to receive seed therefrom.

5. In a cotton-seed planter, the combination with the seedbox and feed-roller, of a shoe having the corners of its front ends diagonally recessed to present inclined shoulders, a V-shaped fender secured against the shoulders, and a cross-bar secured in recesses in the under side of the shoe and to which the outer ends of the fender are secured.

6. In a planter, the combination with the seedbox thereof, and a furrow-opener located in front of the box, of a shoe located between the opener and the box and formed by a plurality of longitudinal members, the outer of which have their rear ends extended to form a throat located beneath the discharge-opening of the seedbox, a cross-bar projected at opposite sides of the shoe members and forming a connection therebetween, and a substantially V-shaped fender embracing the front end of the shoe and having its rear ends connected to the outer ends of the cross-bar.

7. In a planter, the combination with a seedbox, of a shoe located below and in front of the seedbox and having a throat disposed below the discharge-opening of the seedbox to receive seed therefrom, a cross-bar let into the under side of the shoe and projected at opposite sides thereof, a substantially V-shaped fender embracing the front of the shoe and secured to the opposite ends of the cross-bar, and a furrow-opener held between the cross-bar and the apex of the fender.

8. In a cotton-seed planter, the combination with a supporting-frame, of spring-arms carrying a roller, a scraper connecting the rear ends of the arms, straps secured to the supporting-frame and having their outer ends formed into stops to coact with the spring-arms to limit vertical movement of the roller in one direction, and vertically-slotted links carried by the stops and loosely embracing the spring-arms to limit vertical movement of the roller in the opposite direction thereof.

9. In a planter, the combination with a supporting-frame, of spring-arms connected at their forward ends to the frame, a coverer carried by the free rear ends of the spring-arms, straps pendent from the frame, and elongated loop-shaped links swung from the straps and loosely embracing the free end portions of the respective spring-arms, the latter being capable of vertical movement within the links, and the lower ends of the straps lying in the paths of the upward movements of the arms and forming stops to limit said movements.

10. In a seed-planter, a shoe comprising opposite longitudinal members, which have the lower portions of their ends notched and inclined outwardly and rearwardly, an intermediate member disposed between the opposite side members and terminated short of the rear ends thereof, the spaced rear end portions of the side members forming an open-ended throat, a cross-bar let into the lower edges of the side members and located between the throat and the forward end of the shoe, a substantially V-shaped fender fitted to the beveled ends of the side members and secured to the outer ends of the cross-bar, a furrow-opener held snugly between the forward end portions of the side members, the vertex of the fender and the intermediate front side of the cross-bar, and a depressing-gage carried by the under side of the shoe and in communication with the lower open end of the throat.

In testimony that I claim the foregoing as my own I have hereto affixed my signature in the presence of two witnesses.

AMOS G. COX.

Witnesses:
F. O. COX,
J. M. BLOW.